US009310618B2

(12) United States Patent
Curtis et al.

(10) Patent No.: US 9,310,618 B2
(45) Date of Patent: Apr. 12, 2016

(54) LASER BEAM SCANNED DISPLAY APPARATUS AND METHOD THEREOF

(71) Applicant: RealD Inc., Beverly Hills, CA (US)

(72) Inventors: Kevin Curtis, Longmont, CO (US); Gary D. Sharp, Boulder, CO (US); Miller H. Schuck, Erie, CO (US)

(73) Assignee: RealD Inc., Beverly Hills, CA (US)

( * ) Notice: Subject to any disclaimer, the term of this patent is extended or adjusted under 35 U.S.C. 154(b) by 0 days.

(21) Appl. No.: 14/578,129

(22) Filed: Dec. 19, 2014

(65) Prior Publication Data
US 2015/0177530 A1   Jun. 25, 2015

Related U.S. Application Data

(63) Continuation of application No. 13/689,621, filed on Nov. 29, 2012, now Pat. No. 9,057,880.

(60) Provisional application No. 61/565,364, filed on Nov. 30, 2011.

(51) Int. Cl.
*G03B 21/00* (2006.01)
*G02B 27/26* (2006.01)
(Continued)

(52) U.S. Cl.
CPC ............... *G02B 27/26* (2013.01); *G02B 27/22* (2013.01); *G03B 21/14* (2013.01); *G03B 21/204* (2013.01);
(Continued)

(58) Field of Classification Search
CPC .. G02B 6/005; G02B 6/0056; G02F 1/13363; G02F 1/13362; G02F 1/133615; H04N 9/3141; H04N 9/3197; G03B 21/14; G03B 21/204

USPC ............. 353/7, 20, 30, 31, 98, 122; 362/600, 362/609, 97.1, 97.2; 349/5, 7–9, 62, 61, 65, 349/67, 69, 96
See application file for complete search history.

(56) References Cited

U.S. PATENT DOCUMENTS 3,891,560 A    6/1975   Chester
4,938,563 A    7/1990   Nelson
(Continued)

FOREIGN PATENT DOCUMENTS

CN    1678941 A    10/2005
CN    1727957 A    2/2006
(Continued)

OTHER PUBLICATIONS

International search report and written opinion of international searching authority for corresponding PCT application PCT/US2012/067134, mailed Mar. 11, 2013.

*Primary Examiner* — Sultan Chowdhury
(74) *Attorney, Agent, or Firm* — Neil G. J. Mothew

(57) ABSTRACT

Generally, near seamless electronics displays may be employed in cinema and exhibition applications. Laser scanned displays may be enabled such that the display may display three dimensional ("3D") content. A first method to enable a laser scanned display for 3D content may employ polarization, with or without polarization conversion and another method may employ multiple colors. Additionally, the envelope function that may be employed across the display may be achieved by changing laser power as a beam is scanned on the screen or by changing the dwell time of the laser beam on the pixels. One method of minimizing the effects of seams in the screen may be to reduce the screen resolution near the seams by screen design and/or laser beam dwell time or illumination energy.

7 Claims, 6 Drawing Sheets

(51) Int. Cl.
*G03B 21/14* (2006.01)
*G02B 27/22* (2006.01)
*G03B 21/20* (2006.01)
*G03B 21/604* (2014.01)
*B82Y 20/00* (2011.01)
*F21V 8/00* (2006.01)
*H04N 9/31* (2006.01)
*H04N 13/04* (2006.01)
*G03B 35/24* (2006.01)

(52) U.S. Cl.
CPC ............ *G03B 21/604* (2013.01); *H04N 9/3129* (2013.01); *H04N 9/3147* (2013.01); *B82Y 20/00* (2013.01); *G02B 6/005* (2013.01); *G02B 6/0056* (2013.01); *G03B 35/24* (2013.01); *H04N 9/3141* (2013.01); *H04N 9/3197* (2013.01); *H04N 13/0409* (2013.01); *Y10S 977/774* (2013.01); *Y10S 977/952* (2013.01)

(56) References Cited

U.S. PATENT DOCUMENTS

| | | | |
|---|---|---|---|
| 5,260,729 A | 11/1993 | Ullah | |
| 5,928,801 A * | 7/1999 | Broer | G02F 1/13362 349/69 |
| 7,001,021 B2 | 2/2006 | Jorke | |
| 7,445,340 B2 | 11/2008 | Conner et al. | |
| 7,959,295 B2 | 6/2011 | Richards | |
| 2007/0046176 A1 | 3/2007 | Bukesov et al. | |
| 2007/0188711 A1 | 8/2007 | Sharp et al. | |
| 2008/0098488 A1 | 4/2008 | Schadt et al. | |
| 2008/0143970 A1 | 6/2008 | Harbers et al. | |
| 2008/0265263 A1 | 10/2008 | Keuper et al. | |
| 2009/0128781 A1 * | 5/2009 | Li | 353/20 |
| 2009/0161037 A1 | 6/2009 | Lazarev | |
| 2010/0002194 A1 * | 1/2010 | Chen | G02B 5/208 353/20 |
| 2010/0045784 A1 | 2/2010 | Okazaki et al. | |
| 2010/0220384 A1 | 9/2010 | Kimura et al. | |
| 2010/0231491 A1 | 9/2010 | Mizuuchi et al. | |
| 2010/0302798 A1 * | 12/2010 | Papakonstantinou et al. | 362/601 |
| 2011/0080723 A1 | 4/2011 | Kaluzhny | |
| 2011/0205502 A1 | 8/2011 | Kato et al. | |
| 2012/0019788 A1 | 1/2012 | Katou et al. | |
| 2013/0017371 A1 | 1/2013 | Kondo et al. | |
| 2013/0093646 A1 | 4/2013 | Curtis et al. | |
| 2013/0093647 A1 | 4/2013 | Curtis et al. | |

FOREIGN PATENT DOCUMENTS

| | | |
|---|---|---|
| CN | 1841127 A | 10/2006 |
| CN | 101218621 A | 7/2008 |
| CN | 101320133 A | 12/2008 |
| CN | 101452118 A | 6/2009 |

* cited by examiner

LASER BEAM SCANNED DISPLAY APPARATUS AND METHOD THEREOF

CROSS-REFERENCE TO RELATED APPLICATIONS

This application claims priority to U.S. Provisional Patent Application Ser. No. 61/565,364, filed Nov. 30, 2011 entitled "Laser beam scanned display apparatus and method thereof", the entirety of which is herein incorporated by reference.

TECHNICAL FIELD

The present disclosure generally relates to display systems, and more specifically, to two dimensional and three dimensional display technologies, systems, and components.

BRIEF SUMMARY

According to one embodiment of the present disclosure, a scanned laser display apparatus may include a first panel. The first panel may include at least a phosphor layer which may be operable to receive at least some light from a light source and which may be further operable to emit light, a polarizer layer which may be operable to receive at least some light from the phosphor layer, a film patterned retarder layer which may be operable to receive at least some light from the polarizer layer, a diffuser layer which may be operable to receive at least some light from the film patterned retarder layer, and a wavelength selective mirror proximate to the phosphor layer. In one example, the wavelength selective mirror may be operable to substantially reflect RGB light and to substantially transmit light at approximately 405 nanometers. The scanned laser display may also include a light source operable to scan with a beam and further operable to provide light to the first panel, and a second wave plate which may be operable to receive at least some light from the phosphor layer and to transmit at least some light to the polarizer layer. Also, at least some of the light emitted by the phosphor layer may form image pixels for the scanned laser display. In one example, the film patterned retarder layer and the phosphor layer are approximately aligned relative to each other.

Additionally, the scanned laser display apparatus may include a second panel, and the first panel and the second panel may be joined together to form a seam. The first and second panel may be joined together by at least a set of joining features and a set of raised features, and the first and second panel may be flexible. The first panel may be substantially illuminated by more than an individual light engine of an array of light engines. The scanned laser display may also include a backer substrate proximate to the phosphor layer, and the backer substrate may have a surface away from the phosphor layer and the surface may be patterned with prism shaped structures. A stereoscopic image may be produced and include a first image corresponding to a first group of pixels and a second image corresponding to a second group of pixels, in which each of the first group of pixels and the second group of pixels may be substantially defined by a film patterned retarder alignment. Furthermore, the first image and the second image may be viewed with polarized glasses.

According to another embodiment of the present disclosure, a scanned laser display system may include a substrate proximate to a phosphor layer, in which the phosphor layer may include a first set of three colors and a second set of three colors, and the phosphor layer may be operable to emit light to produce a stereoscopic image. The first set of three colors may be operable to produce a first image and the second set of three colors may be operable to produce a second image. The scanned laser display system may include at least one of a passivation layer or a protective layer proximate to the phosphor layer and the phosphor layer may be quantum dots. The scanned laser display system may also include a second panel, and the first panel and the second panel may be joined together to form a seam and the first panel and the second panel may be flexible. Additionally, the scanned laser display system may include an array of light engines and the first panel may be substantially illuminated by more than an individual light engine of the array of light engines According to another embodiment of the present disclosure, a stereoscopic display system may include a light source operable to scan with a beam and further operable to produce light, at least a first substrate and a second substrate which may be joined together to form a seam and operable to receive light from the light source, a first phosphor layer proximate to the first substrate and a second phosphor layer proximate to the second substrate, both of which are operable to transmit light for stereoscopic images, and an array of light engines, in which the first substrate may be substantially illuminated by more than an individual light engine of the array of light engines. Furthermore, the seam between the first and second substrates is aligned to be in a gap between pixels on at least one of the first or second substrate.

Electronic displays that appear as substantially seamless may be employed for general use in at least cinema and exhibition applications including commercial display applications for business, education, and consumer in home displays. The tiled displays that appear as substantially seamless, may employ specific data formats for use in displaying images on individual displays which may be tiled together to form a larger tiled, near seamless display, and may employ other techniques not utilized in known video wall applications. These functions may include an intensity envelope and may enable laser scanned displays as 3D displays by using either polarization, with or without polarization conversion, multiple colors, or any combination thereof.

Generally, one embodiment of the present disclosure may take the form of a laser scanned display. Laser scanned displays may be enabled such that the display may display three dimensional ("3D") content. A first method to enable a laser scanned display for 3D content may employ polarization, with or without polarization conversion and a second method may employ multiple colors. Additionally, the envelope function that may be employed across the display may be achieved by changing laser power as a beam is scanned on the screen or by changing the dwell time of the laser beam on the pixels. One method of minimizing the effects of seams in the screen is to make screens with sections that are larger than the laser scanning illumination devices that illuminate it. These screens may be suspended similar to a movie screen, or supported in front of the array of laser scanning illumination devices. The screens can be flat or curved.

BACKGROUND

Generally, current projection and display technologies may include functionality to deploy, view and/or display three dimensional ("3D") content. Recently, the increased demand for such functionality has driven the need for enhanced performance of projection and/or display technology, including increasing the brightness of the display. For example, larger displays may include multiple smaller displays tiled together. Such a configuration may be known as a video wall. A video wall may include multiple displays, monitors, projector based displays, televisions, liquid crystal displays, light emitting diode displays, organic light emitting diode displays and so forth, tiled together and adjacent to one another or overlapped to form a larger display.

BRIEF DESCRIPTION OF THE DRAWINGS

Embodiments are illustrated by way of example in the accompanying figures, in which like reference numbers indicate similar parts, and in which.

DETAILED DESCRIPTION

Figure 1:
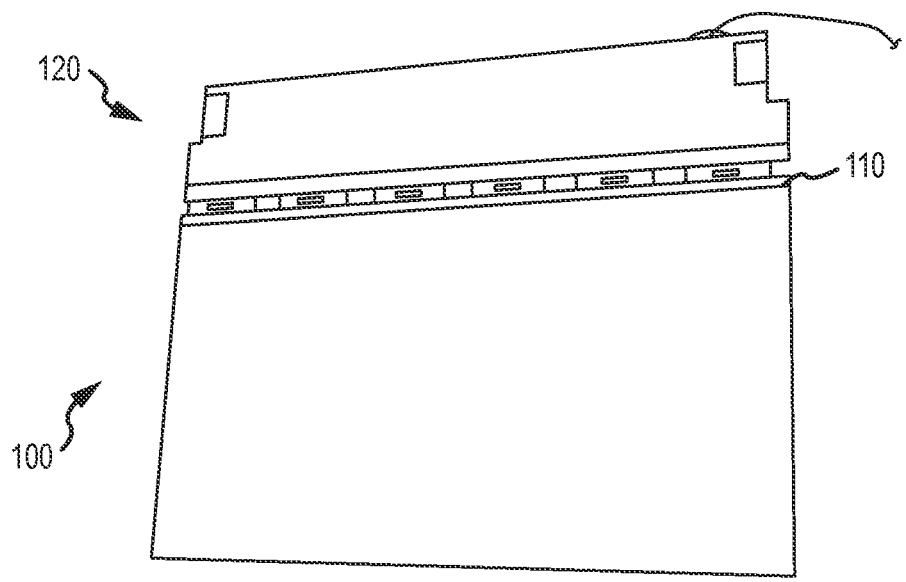
FIG. 1 is a schematic diagram illustrating one embodiment of a liquid crystal display panel.

Generally, one method for enabling stereoscopic displays may include employing polarization with two roughly orthogonal states and another method may employ at least six colors. In one example, the color set may be provided by two sets, each set with three primary colors. One color set of pixels may be used to display a view for a first eye while the other color set may display a view for a second eye. Additionally, a viewer may wear glasses that separate out the two images into left and right images thus achieving stereoscopic or three dimensional (3D) viewing. The terms stereoscopic and 3D may be used interchangeably herein.

Another method may employ film patterned retarder ("FPR") to achieve right/left eye polarization states. General discussions may be provided in the following references including, U.S. Pat. No. 5,260,729, U.S. patent application Ser. Nos. 11/673,556, 13/507,574, U.S. Pat. Nos. 7,001,021, and 7,959,295, all of which are herein incorporated by reference in their entirety.

According to one embodiment of the present disclosure, a scanned laser display apparatus may include a first panel. The first panel may include at least a phosphor layer which may be operable to receive at least some light from a light source and which may be further operable to emit light, a polarizer layer which may be operable to receive at least some light from the phosphor layer, a film patterned retarder layer which may be operable to receive at least some light from the polarizer layer, a diffuser layer which may be operable to receive at least some light from the film patterned retarder layer, and a wavelength selective mirror proximate to the phosphor layer. In one example, the wavelength selective mirror may be operable to substantially reflect RGB light and to substantially transmit light at approximately 405 nanometers. The scanned laser display may also include a light source operable to scan with a beam and further operable to provide light to the first panel, and a second wave plate which may be operable to receive at least some light from the phosphor layer and to transmit at least some light to the polarizer layer. Also, at least some of the light emitted by the phosphor layer may form image pixels for the scanned laser display. In one example, the film patterned retarder layer and the phosphor layer are approximately aligned relative to each other.

Additionally, the scanned laser display apparatus may include a second panel, and the first panel and the second panel may be joined together to form a seam. The first and second panel may be joined together by at least a set of joining features and a set of raised features, and the first and second panel may be flexible. The first panel may be substantially illuminated by more than an individual light engine of an array of light engines. The scanned laser display may also include a backer substrate proximate to the phosphor layer, and the backer substrate may have a surface away from the phosphor layer and the surface may be patterned with prism shaped structures. A stereoscopic image may be produced and include a first image corresponding to a first group of pixels and a second image corresponding to a second group of pixels, in which each of the first group of pixels and the second group of pixels may be substantially defined by a film patterned retarder alignment. Furthermore, the first image and the second image may be viewed with polarized glasses.

According to another embodiment of the present disclosure, a scanned laser display system may include a substrate proximate to a phosphor layer, in which the phosphor layer may include a first set of three colors and a second set of three colors, and the phosphor layer may be operable to emit light to produce a stereoscopic image. The first set of three colors may be operable to produce a first image and the second set of three colors may be operable to produce a second image. The scanned laser display system may include at least one of a passivation layer or a protective layer proximate to the phosphor layer and the phosphor layer may be quantum dots. The scanned laser display system may also include a second panel, and the first panel and the second panel may be joined together to form a seam and the first panel and the second panel may be flexible. Additionally, the scanned laser display system may include an array of light engines and the first panel may be substantially illuminated by more than an individual light engine of the array of light engines According to another embodiment of the present disclosure, a stereoscopic display system may include a light source operable to scan with a beam and further operable to produce light, at least a first substrate and a second substrate which may be joined together to form a seam and operable to receive light from the light source, a first phosphor layer proximate to the first substrate and a second phosphor layer proximate to the second substrate, both of which are operable to transmit light for stereoscopic images, and an array of light engines, in which the first substrate may be substantially illuminated by more than an individual light engine of the array of light engines. Furthermore, the seam between the first and second substrates is aligned to be in a gap between pixels on at least one of the first or second substrate.

FIG. 1 is a schematic diagram illustrating one embodiment of a liquid crystal display ("LCD") panel 100. The LCD panel 100 illustrated in FIG. 1 has a border 110 which may be dead space or a gap, and which may be primarily responsible for the visible seams in the larger composite display. In one example, multiple LCD panels may be placed adjacent to one another with the borders located next to each other, or overlapping one another. In this example, due to the overlapping borders, a gap or dead space may be visible between the displays of the LCD panels. As illustrated in FIG. 1, the LCD panel also has a portion 120 which may be flexible and which may include drive and interface electronics. Typical video walls use LCD panels that are enclosed with a structure that includes the power and drive electronics. This typically increases the bezel size and thus the seam size between displays. LCD panels can refer to the basic panel itself or the encased panel with drive and power electronics. Similarly, displays can refer to the basic display or the packaged display with electronics.

Figure 2:
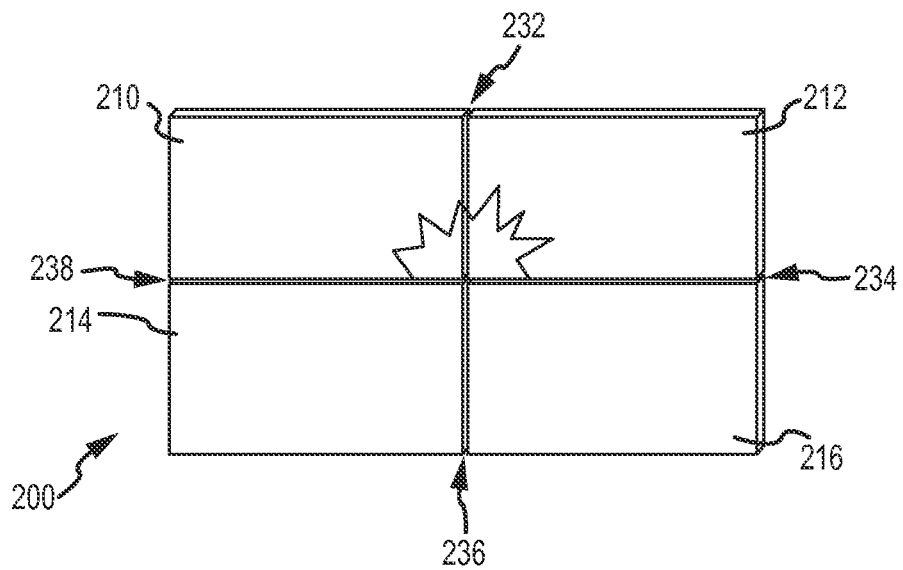
FIG. 2 is a schematic diagram illustrating one embodiment of a video wall.

FIG. 2 is a schematic diagram illustrating one embodiment of a video wall. FIG. 2 illustrates a video wall 200 with four displays 210, 212, 214, 216, assembled to present an image 220 on a much larger composite display. The four displays may produce clearly visible static lines or blank gaps 232, 234, 236, 238, between the individual panels or displays that make up the larger composite display. Although some screens may have narrow bezels for minimizing mullion, the lines or gaps may still be visible. The gaps can be reflective or dark. Most video walls use dark bezels so that the seams may appear dark.

While these tiled displays certainly have a place in the market, the seams (gaps or mullions) make these displays completely unacceptable for viewing high quality video or still images. These gaps or mullions may be unacceptable in locations including, but not limited to, movies theaters and large venue theaters.

Some manufacturers such as Toshiba and Prysm have developed displays that use a laser beam scanned in the UV, blue, or green light to excite phosphors from behind the display panel to emit blue, green, and red color on the screen in the direction of the audience. Both Toshiba and Prysm prefer to use laser diodes centered at 405 nm to excite different phosphors as these lasers are high power, low cost, and demonstrate reasonable reliability. These displays can be tiled together to make larger displays as generally discussed in U.S. patent application Ser. Nos. 13/655,261 and 13/655,277, both of which are herein incorporated by reference in their entirety. These laser beam scanned displays are typically used for advertising or other applications that do not require high quality displays or high resolution content and do not have 3D viewing capability.

Generally, near seamless electronics displays (in which the seams may be mostly hidden by the pixel gaps, use of diffusers, and so forth) may be employed in cinema and exhibition applications. Laser scanned displays may be enabled such that the display may display three dimensional ("3D") content. A first method to enable a laser scanned display for 3D content may employ polarization, with or without polarization conversion and another method may employ multiple colors. Additionally, the envelope function that may be employed across the display may be achieved by changing laser power as a beam is scanned on the screen or by changing the dwell time of the laser beam on the pixels. One method of minimizing the effects of seams in the screen may be to reduce the screen resolution near the seams by screen design and/or laser beam dwell time or illumination energy. Further, in addition to the tiling of individual modules, the screens/panels can be manufactured in larger areas and may be seamed together to make a large theater size screen and may use multiple light engines to drive the corresponding portion of this large screen. The seams in these large screens may also be mostly hidden in the pixel gaps and may not be substantially visible at appropriate viewing distances. One example of an appropriate viewing distance is for movies, which may be more than approximately ten feet away from screen. In some cases though, the large screens may not have a seam. Structures may also be added to the panels to increase the brightness of the displays in two or three dimensional modes of operation. These embodiments will be discussed in further detail herein.

3D Laser Based Displays

One practical and economical approach to presenting 3D content may include employing a polarizer and a film patterned retarder ("FPR") film that may be proximate to or attached to the screen. In one example, the film patterned retarder may be a liquid-crystal polymer with approximately a quarter-wave of retardation. FPR may be referred to as film pattern retarder, fixed pattern retarder, film patterned retarder, fixed patterned retarder and so forth. The film patterned retarder may be patterned in stripes with alternating orientations of approximately ±45° relative to the input linear polarization. The right and left eye images used to form the 3D image may then be presented on alternating lines or groups of pixels and may be separated into left and right eye images by a pair of polarizing glasses which may be worn by a viewer. These lines of retardation may be available in standard or non-standard formats of film patterned retarders. The non-standard formats of film patterned retarders may be, but is not limited to, alternating pixels or alternating groups of pixels. Further, the screen for laser scanned displays may have a pattern of phosphors layered in a substantially rigid or flexible structure. The structure may be glass, polymer, or any other appropriate structure. When used with phosphors the structure may contain a polarizer before the film patterned retarder because the emission of phosphors may be un-polarized. The phosphors may be excited by an appropriate wavelength, and may emit red, green or blue light, thus together may form image pixels for the display. The phosphor may be printed close, for example in the approximate range of 1-500 microns, to the display surface which may enable a large viewing angle.

Figure 3:
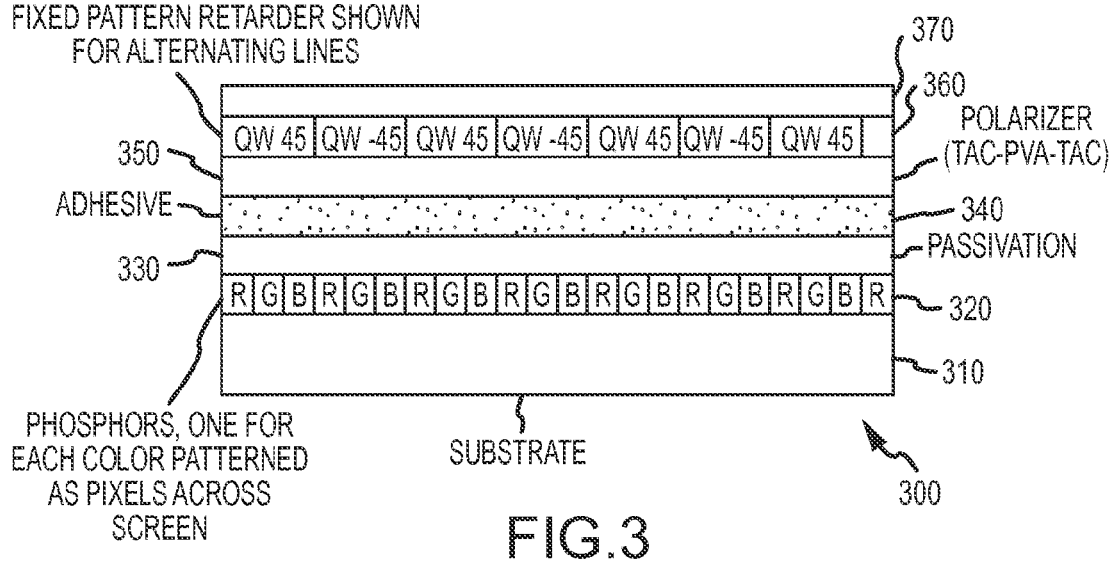
FIG. 3 is a schematic diagram illustrating one embodiment of a display with a polarizer and a film patterned retarder, in accordance with the present disclosure.

One embodiment of a display structure with a polarizer and a FPR is illustrated in FIG. 3. FIG. 3 is a schematic diagram illustrating one embodiment of a display with a polarizer and a film patterned retarder. In FIG. 3, the display 300 may include a substrate 310, a phosphor layer 320, a passivation layer 330, an adhesive 340, a polarizer 350, a film patterned retarder 360, and a diffuser 370. The phosphor layer 320 may include a phosphor for each color that may be patterned as pixels across a screen. Further, there may be gaps between the pixels to reduce crosstalk. Additionally, the film patterned retarder is illustrated for alternating orientation lines of ±45° relative to the input linear polarization. Furthermore, as illustrated in FIG. 3, a diffuser layer 370 or a protective layer may be proximate to the film patterned retarder 360. The passivation layer 330 may or may not be included and in one example, there a spacer may be included. Additional layers may also be incorporated. For example, a layer that reflects or absorbs the illuminating laser light (for example, approximately 405 nm) to substantially prevent the illuminating laser light from reaching the viewer may be incorporated after the phosphor layer.

As illustrated in FIG. 3, the polarizer 350 can be absorbing, and in one example may be PVA (poly vinyl alcohol) based.

In another example, the polarizer may be reflective, and may employ wire grid polarizing technology. The substrates and protective layers can be glass or plastic or any other suitable material, and can be thin film coated for anti-reflection or anti-scratch properties. In one example, a SiO2 layer may be used to achieve these functions. The film patterned retarder 360 may cause a change in polarization state per line or group of pixels as formed in the phosphor layer 320. It may be appropriate for the FPR and phosphor layers to be approximately aligned relative to each other. These layers can be aligned to approximately 25% of the pixel pitch dimension or better. The FPR and phosphor layers may be aligned so that the individual colors of the phosphor layer may be aligned to the orientation regions of the film patterned retarder. In one example, the phosphor layer may include patterns of red, green, and blue phosphors and these may be approximately aligned with the region of the film patterned retarder orientation of approximately +45°. Continuing the example, the next red, green, and blue phosphors may be approximately aligned with the region of the film patterned retarder orientation of approximately −45°, and so forth.

The polarization state per eye can be any two roughly orthogonal states, such as left and right circular polarization states. The substrate or other material layers may have servo marks or fiducial marks that can be read by a light engine to track illumination position accurately. The marks may be read by the same or a different color laser than the illumination laser. This may allow for the previously discussed seamless techniques to be used to make a large, visibly high quality, 3D display for cinema or large venue use.

The layers of FIG. 3 can be manufactured in various ways including, but not limited to, roll-to-roll coating, thin film deposition and so forth. The FPR may be joined to the polarizer film by adhesion, lamination, bonding, any combination thereof, and so forth. The FPR/polarizer film may be roll-to-roll laminated to the phosphor film to reduce manufacturing cost. The FPR/polarizer film can be die cut and batch laminated to transparent substrate panels. The panels can then be joined to make monitors with small gaps as previously discussed. The seams between panels, displays or screens of a laser scanned display may be small and in the approximate range of 0.05 mm-1 mm and can be masked by various methods including, but not limited to, using a diffuser in front of the screen, or by employing waveguides used on macropixels, aligning the seams to gaps in the pixel structure, and so forth, as generally discussed in U.S. patent application Ser. Nos. 13/655,261 and 13/655,277, both of which are herein incorporated by reference in their entirety. A diffuser on top of the FPR layer may also be used to minimize the alternating line effect that is generated by the FPR structure when viewed in 3D (using glasses). The data architecture may be employed to comply with DCI issues and formatting as well. Advantages of these displays may include, but are not limited to low energy and very long lifetimes.

Figure 4:
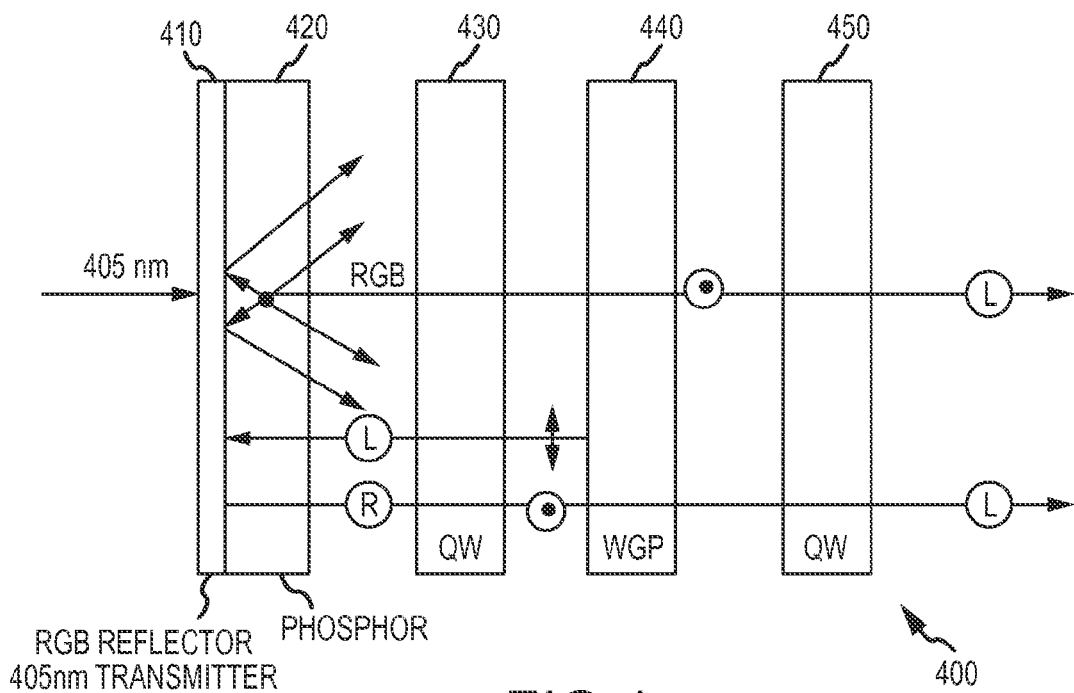
FIG. 4 is a schematic diagram illustrating one embodiment of a polarization system, in accordance with the present disclosure.

One issue of the polarization method of FIG. 3 may be that approximately half of the energy may be lost at the polarizer. However, it may be possible to achieve polarization conversion on the rejected polarization using films and layers. A wavelength selective mirror may be used to address the issue and may allow approximately 405 nm light to be substantially transmitted to the phosphors while substantially reflecting the desired visible light. This structure is illustrated in FIG. 4. FIG. 4 is a schematic diagram illustrating one embodiment of a polarization system. The system 400 of FIG. 4 may include a wavelength selective mirror 410, a phosphor layer 420, a quarter wave plate 430, a polarizer 440, and a second quarter wave plate 450. The system 400 may be operable to receive light as indicated in FIG. 4. In one example, the light entering the system 400 may be approximately 405 nm. The light may encounter the wavelength selective mirror 410 which may substantially reflect RGB light and may substantially transmit light at approximately 405 nm. As illustrated in FIG. 4, a quarter wave plate 430 ("QW") may be inserted before the polarizer 440 ("WGP") to substantially convert the rejected polarization into the appropriate polarization. The second wave plate 450 may be a fixed patterned retarder. This system may be employed to recover most of the light that may be lost and additionally may capture more of the light from the phosphors that may have been emitted back towards the light engine rather than in the direction of the viewer.

Figure 5:
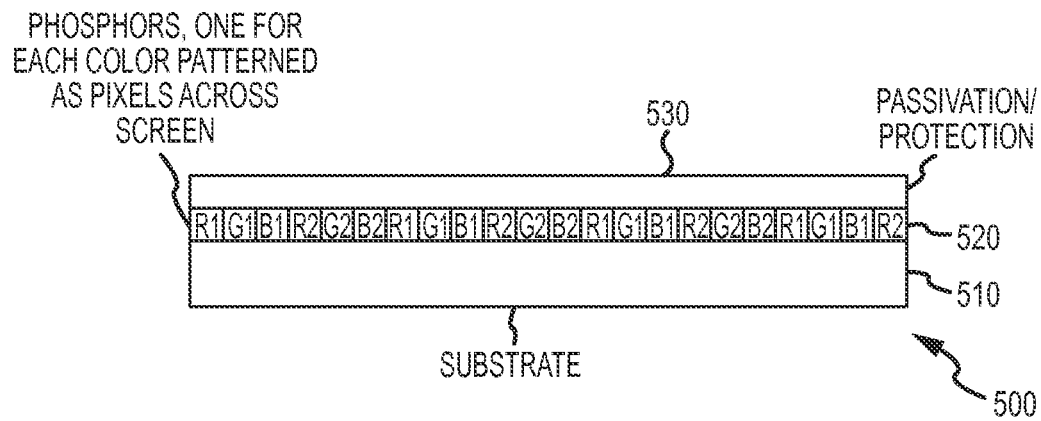
FIG. 5 is a schematic diagram illustrating one embodiment of a display, in accordance with the present disclosure.

Another method for enabling laser scanned displays to display 3D content may employ different colors for the left and right eye. The different colors may be appropriately separated into left and right eye images by a pair of glasses which may be worn by a viewer. The glasses may have different notch color filters that may substantially pass one group of colors while substantially blocking another group of colors. The construction of such a display is illustrated in FIG. 5. FIG. 5 is a schematic diagram illustrating one embodiment of a display. The display 500 may include a substrate 510, a phosphor layer 520, and a passivation or protection layer 530. The phosphor layer 520 may include a phosphor for each color patterned as pixels across a screen. Additional color filter layers may also be incorporated to narrow the spectrum of the pixel colors to improve crosstalk.

Figure 6:
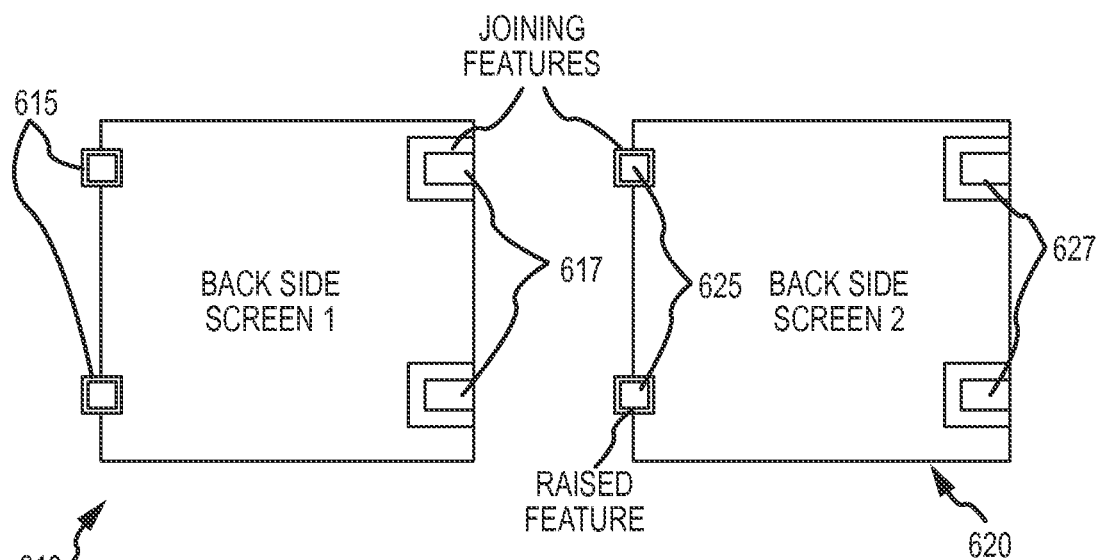
FIG. 6 is a schematic diagram illustrating a method for joining panels together, in accordance with the present disclosure.

As illustrated in FIG. 5, display 500 may include a first set of red, green and blue colors which may be used for the right eye image and a second set of colors may be used for the left eye. Additionally, the second set of colors may be primary colors. Further illustrated in FIG. 5, is one example of a display screen for six color 3D display with alternating lines or alternating pixels that correspond to different color sets. The substrate may include AR and/or servo tracks/marks. The phosphors can include quantum dots, and phosphors in quantum wells and other resonant structures to allow emission of a narrower spectrum. A narrow spectrum may allow for better system design, such as less crosstalk, for a six color system. 3D screens Panels may be joined together by features that allow the panels to "snap" together as illustrated in FIG. 6. FIG. 6 is a schematic diagram illustrating a method for joining panels together. In FIG. 6, the back side of screen 610 may have a first side with raised features 615 and a second side with joining features 617. Similarly, the backside of screen 620 may have a first side with raised features 625 and a second side with joining features 627. As shown in FIG. 6, the second side of screen 610 may be joined with the first side of screen 620. The two sets of raised features and two sets of joining features per screen are illustrated for discussion purposes only and not of limitation. More features per screen may be employed as appropriate.

Joining features can be incorporated into the manufacturing of the panel, or via mechanical or adhesive attachment steps subsequent to panel manufacturing. A polymer substrate such as acrylic can be used and may be part of the mold for the substrate. In one example, the joining features can "snap" together with features like a buckle or LEGO-type blocks. The joining features can also be used to glue the displays together more effectively.

Figure 7:
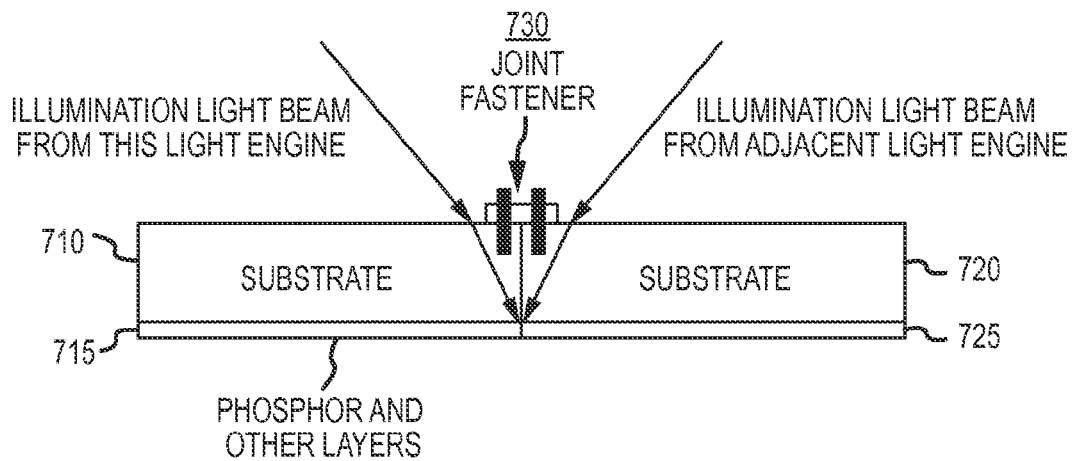
FIG. 7 is a schematic diagram illustrating another method for joining panels together, in accordance with the present disclosure.

FIG. 7 is a schematic diagram illustrating another method for joining panels together. FIG. 7 illustrates another type of joint fastener that may be applied to join the two substrates or panels together mechanically. FIG. 7 includes a first substrate with a first set of layers 715, a second substrate 720 with a second set of layers 725, and a joint fastener 730. The first and second sets of layers 715, 725, respectively may include layers such as the phosphor layer, protective layers, polarizer, FPR, and so forth. The joint fastener 730 can be applied to join the panels together mechanically to form one large screen. The panels may be supported by a mechanical metal frame from the sides and top. Also in FIG. 7, is one possible embodiment illustrating a way in which light may be provided to the seam created between the joined first and second substrates or panels. The light engines that provide light to the panels may be angled such that the illuminating light beams from adjacent light engines may provide a light path to the seam of the joined panels. The power of the light engine illumination can be increased at the edges to overcome additional losses associated with joining the panels or screen sections together.

Figure 8:
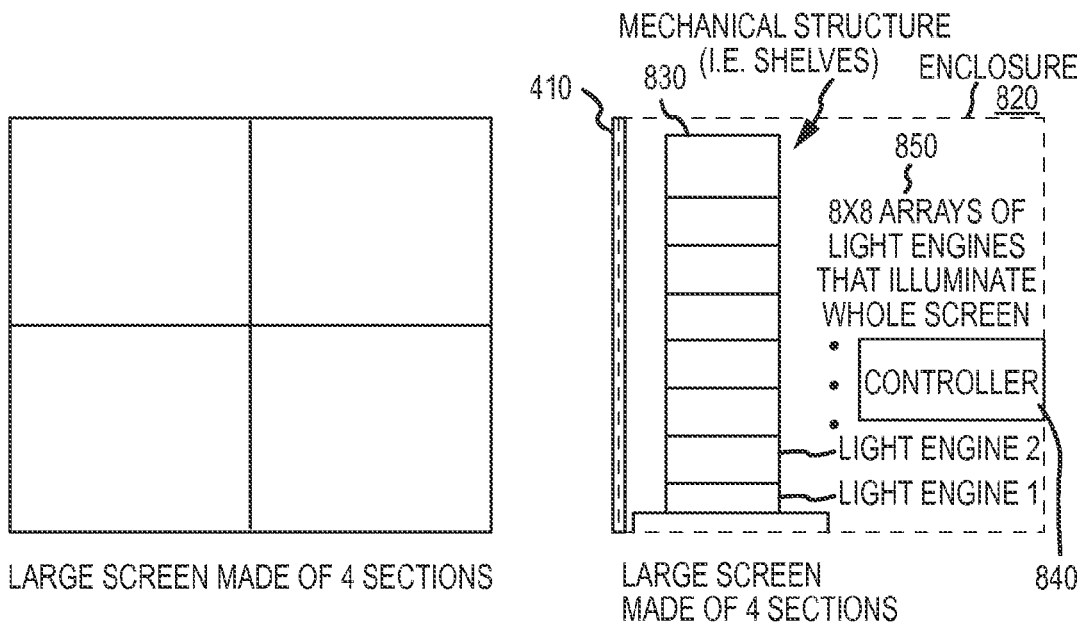
FIG. 8 is a schematic diagram illustrating one embodiment of a display system and an enclosure, in accordance with the present disclosure.

Rather than make individual modules which may include a light engine, a panel/screen, and a mechanical housing, there is an alternative construction. FIG. 8 illustrates an example of this system. FIG. 8 is a schematic diagram illustrating one embodiment of a display system and an enclosure. FIG. 8 illustrates a front view of screen 810 and an enclosure 820 that includes a side view of screen 810. The enclosure 820 includes a mechanical structure 830, a controller 840, and an array of light engines 850. In the example of FIG. 8, the array of light engines may be an 8×8 array that may substantially illuminate the entire screen. Additionally, the array of light engines may or may not be aligned with the seams in the screen. Further, the screen 810 may be any type of substrate including, but not limited to, PVC, PC, PET, and so forth.

In one embodiment, a large theater sized screen can be manufactured with all of the appropriate layers and coatings by seaming together the panels/screens. Rolls may be made with printed six color stripes, which in one example may be three 3 colors, and a polarizer/FPR, on a transparent substrate which may then be joined and installed, as generally described in U.S. patent application Ser. No. 13/549,304, which is herein incorporated by reference in its entirety. The substrate may be, but is not limited to, PET, PVC, PC, and so forth. Next, the large screen may be installed in the theater and light modules may be arranged behind a portion of the screen and may be illuminated and driven appropriately. As illustrated in FIG. 8, the light modules and/or engines may be held in a mechanical assembly to approximately maintain a position relative to the corresponding screen portion that may be illuminated and driven by the light module and/or engine. The screen may have servo marks and fiduals markings so that the screen may be self aligned and/or calibrated on the corresponding portion of the screen that may be illuminated. Also as illustrated in FIG. 8, the whole assembly of light engines or part of the light engines may be enclosed for security and dust protection. The light engines may produce or emit light including, but not limited to, UV, RGB, visible, IR, deep blue light, approximately 405 nm, any combination thereof, and so forth.

Additionally the screen can be manufactured such that the rolls may be approximately the length or height of the entire video wall with seams in one direction. These seams may be hidden by substantially aligning them to pixel gaps. The screen can be suspended by attachment to a frame by springs or other tension mechanisms similar to movie screens. The light engine array may be located behind the screen. The screen can be flat or curved with the light engine array also flat or curved to match the screen.

Envelope Function

Typical movie screens that receive light with projectors may have an intensity falloff from the center of the screen to the edges. For movies or projection technology, the edge intensity of the screen may be approximately 70-80% of the center intensity of the screen which complies with the DCI specification for theaters. For viewing rooms or small theaters that may be used to review movies for editing or an award screening, the desired falloff may be approximately 90%. In addition, theaters may include alternative content for the public such as sports and/or musical events. The alternative content may employ a different intensity profile than may be employed for movie content. This intensity fall off or intensity envelope function from center to edges may be a result of the natural intensity fall off due to the projector. Tiling screens together may result in a screen that may be substantially uniform in intensity across the entirety of the tiled screen surface.

In some cases, intensity uniformity across the tiled screen surface may not be desirable. For example, directors may use the intensity fall off to focus the attention of the viewer to the center of the screen. By employing monitors to make up the screen it may be possible to specify a different intensity envelope function for a particular movie or even for individual scenes in the movie or event. In addition, intensity functions that are impossible to achieve with projectors may be achieved by the digital tiled screens. For example, flat intensity profiles or profiles with brighter edges than the center can be specified. The intensity envelope function can be achieved by limiting the brightness of the individual screens as a function of the physical location in the larger display. The monitors may be brighter than any intensity that may be employed, thus limiting the brightness may be possible without significantly affecting the desired overall brightness of the movie and/or content. This limiting or scaling of intensity values may depend on position and may be employed nearly continuously across the monitors themselves as well as across multiple monitors. The digital values that represent the content to be presented can be scaled by a digital processor to generate the desired envelope function.

Figure 9:
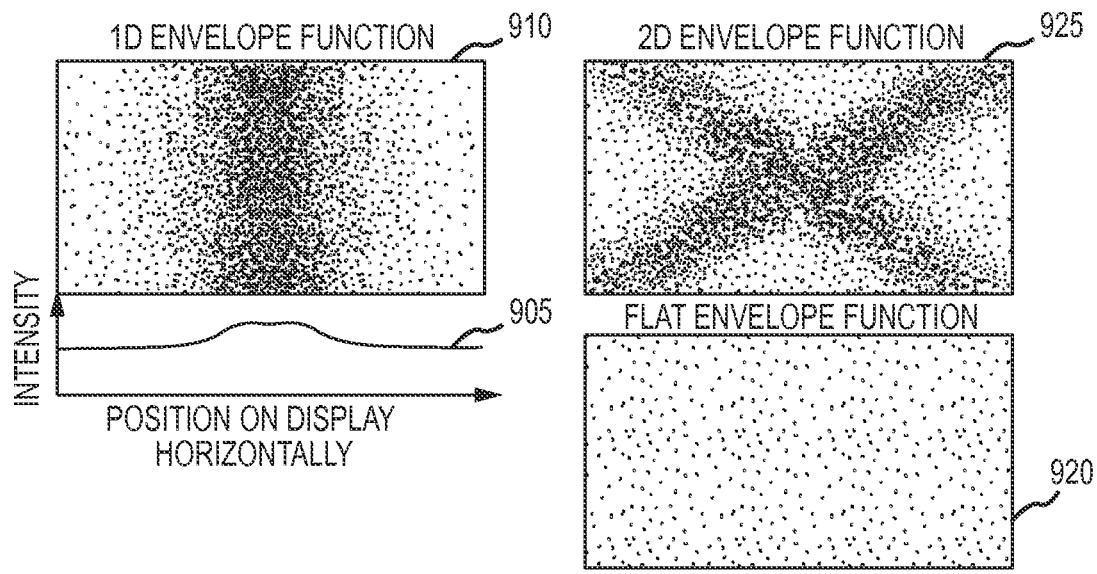
FIG. 9 is a schematic diagram illustrating examples of envelope functions, in accordance with the present disclosure.

FIG. 9 is a schematic diagram illustrating examples of envelope functions. The envelope function can be one dimensional as shown in function 910 or substantially along the horizontal direction and uniform vertically. As illustrated in FIG. 9, intensity graph 905 varies in intensity in the horizontal direction and is substantially uniform in the vertical direction. The envelope function may be mostly uniform across the display as in 920. Also illustrated in FIG. 9, intensity function 925 varies in intensity in both the horizontal and vertical directions. These functions may be employed and specified for both 2D and 3D content.

For a laser based display, one technique in which this effect may be achieved over the composite screen may include changing the laser beam intensity and/or dwell time on the pixels. Further, the beam steering laser engine may additionally steer the beam across tile boundaries to substantially smooth the transition from one tile or screen sections to the other by changing intensity near the edges. The laser engine may also reduce the appearance of seam effects between tiles or screen sections by reducing the resolution of the image near the boundary by illuminating large pixels areas or by designing the pixels of the screen as formed by the phosphors to be larger. For example the pixel near the boundary may be approximately 10% large than the pixels in the center of the tile or screen section.

Engineered Structures for Light Recycling and Brightness

Phosphor and quantum dots emit visible light when stimulated by light of a different wavelength. One example of stimulating light is deep blue laser light, which may be produced at approximately 405 nm by direct emission laser diodes. A display may be constructed by applying different color phosphors to a backer such as plastic or glass, and then stimulating visible light emission at a given location by directing deep blue laser light at the screen. Efficiency may be important for reducing the amount of deep blue laser light incident on the screen. Light recycling schemes may be employed to increase the efficiency of the system and better direct light to the audience as discussed herein.

Figure 10:
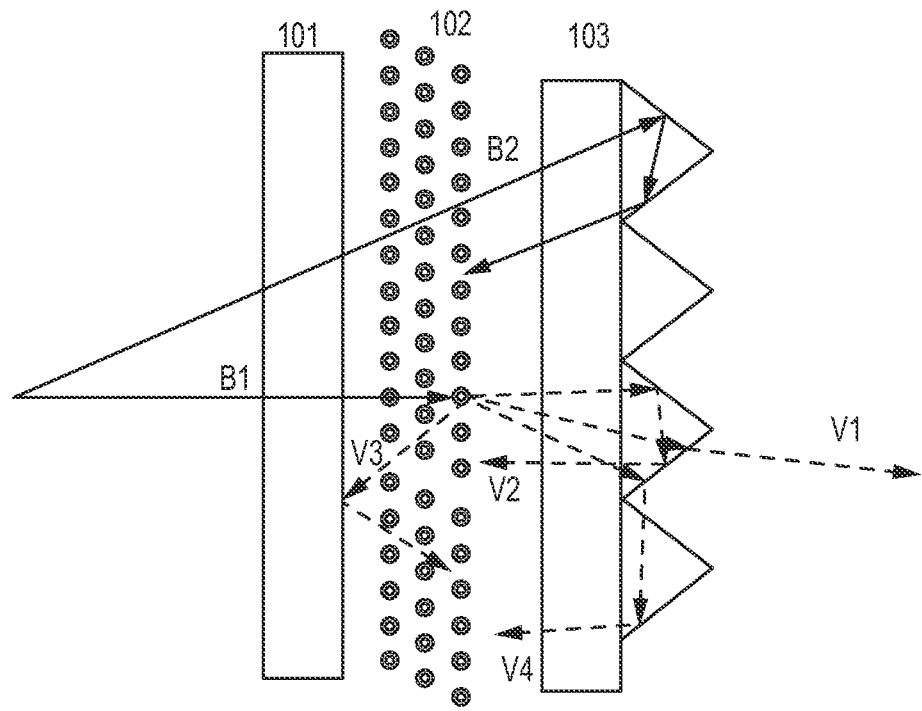
FIG. 10 is a schematic diagram illustrating one embodiment of a light recycling display screen, in accordance with the present disclosure.

FIG. 10 is a schematic diagram illustrating one embodiment of a light recycling display screen. Further, FIG. 10 illustrates one example of a light recycling display screen built with phosphors or quantum dots. As illustrated in FIG. 10, incident deep blue laser illumination, B1 and B2, may pass through a backer 101 from the direction of the first side of the backer 101. An emitter layer, for example phosphor or quantum dots, 102 may be deposited on a second side of the backer 101. The second side or surface of the backer 101 proximate to or closest to the emitter layer may be coated to transmit deep blue light, for example at approximately 405 nm and reflect visible light, such as in the approximate range of 440-700 nm. Incident illumination ray B1 may pass through the backer 101 and may strike an emitter layer particle. The particle may then re-emit light at a visible wavelength. The re-emitted light may take several paths, some of which are discussed below.

In one example, the re-emitted visible light may follow ray path V1. Ray V1 may pass through a second backer 103. The surface away from the emitter layer 102 of the second backer 103 may be formed with an outer surface which may resemble prisms. These prisms may serve as an optical structure to substantially direct incident light into a desired cone angle. Ray V1 may be within this given cone angle and may pass through the second backer 103 to the audience.

In another example, the re-emitted visible light may follow ray path V2. Ray V2 may have an angle in air that may be outside of the desired cone angle. Ray V2 may pass through the first surface proximate to the emitter layer of the second backer 103, but may be total-internally-reflected by the prism. The deflected ray may re-enter the emitter layer. Ray V2 may then scatter from a particle, and a portion of the energy may re-enter backer 103 and emerge as light within the desired cone angle. This portion of the light may be effectively recycled back into the desired cone angle, which may enhance the brightness of the display within the desired cone angle.

In yet another example, the re-emitted visible light may follow ray path V3. Ray V3 may emit in a direction substantially away from the second backer and substantially towards the first backer. The first backer, as stated previously, may have a coating that may reflect visible light. Ray V3 may reflect from the coating on the first backer 101 and may re-enter the emitter layer and may eventually emerge from the second backer 103 as light within the desired cone angle.

In still another example, the re-emitted visible light may follow ray path V4. Ray V4 may have an angle in air that may be outside of the desired cone angle. Ray V4 may pass through the first surface of the second backer 103, but may be refracted by a prism and a neighboring prism and may be refracted back into the emitter layer. Ray V4 may then scatter from a particle, and a portion of the energy may re-enter backer 103 and emerge as light within the desired cone angle. This portion of the light may be effectively recycled back into the desired cone angle, which may enhance the brightness of the display within the desired cone angle.

In each of the examples of rays V2, V3, and V4, energy in rays which may be outside of the desired cone angle may have an opportunity to re-emerge from the screen as energy which may be substantially inside the desired cone angle. Although discussed as such, the structure may not be a prism and may be other types of structures. For example, the structure may be, but is not limited to, a rounded prism, a convex lens, a spline, a linear prism, several layers of linear prisms, a pyramidal type prism, and so forth. The various structures may work to recycle light that may generally emit outside of a desired cone angle back into the emission layer. The shape of the "prism" feature may primarily determine the shape of the output emission, as generally discussed, for example, in U.S. Pat. No. 4,938,563, which is herein incorporated by reference in its entirety, and also which discusses prism-like structures which may be utilized to recycle light in signage and LCD backlight applications.

In the example in which the prism structure side of the second backer 103 is coated such that it transmits visible light, for example, in the approximate range of 440-700 nm and reflects deep blue light, for example at approximately 405 nm, further brightness enhancement can be realized. For example, incident deep blue ray B2 may pass through the emitter layer without striking a phosphor or quantum-dot particle. The ray may then pass into the second backer where it may encounter the coated prism structure. In this case, the prism structure may function as a retro-reflector to the incident deep blue ray, and may cause the ray to deflect back into the emitter layer nearly parallel to and displaced from its original path. The ray may have a second chance to strike a particle and create a visible emission. In this way, incident blue rays that may be lost can be recycled back into the emitting layer, and may create emission of visible light and produce a brighter image. In addition, the coating may prevent the deep blue laser light from reaching the audience, and may prevent unintended exposure to the audience and color shifting in the final image.

One embodiment may include recognition of considerable space per-pixel to incorporate additional spatial functionality via arrays of sub-pixels. For example, a pixel used in digital cinema may be approximately 5-6 mm in size at the screen, yet roll-to-roll manufactured diffractive/refractive structures and laser spot sizes can be substantially smaller. Roll-to-roll manufactured structures can have feature sizes on the order of tens of microns, and excitation sources may exist to address individual features of this size. As such, functions such as beam-steering, local power, phase control, and amplitude control can be achieved at the sub-pixel level by employing embodiments discussed herein. The ability to address arrays of sub-pixels with specific functionality may be used when implementing technologies such as autostereoscopic display. Conversely, it may be relatively difficult for AMLCD manufacturers to increase pixel density for high quality multi-view autostereoscopic display.

Figure 11:
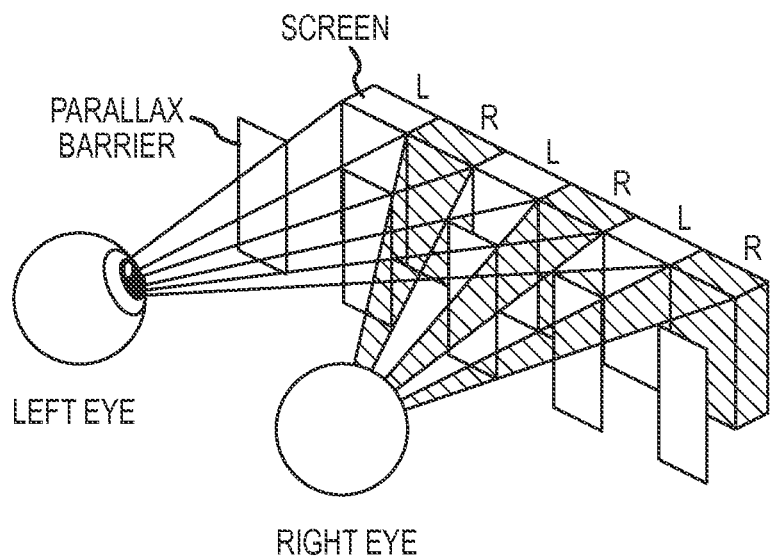
FIG. 11 is a schematic diagram illustrating embodiments of a parallax-barrier autostereoscopic display and lenticular autostereoscopic display, in accordance with the present disclosure.
Figure 11:
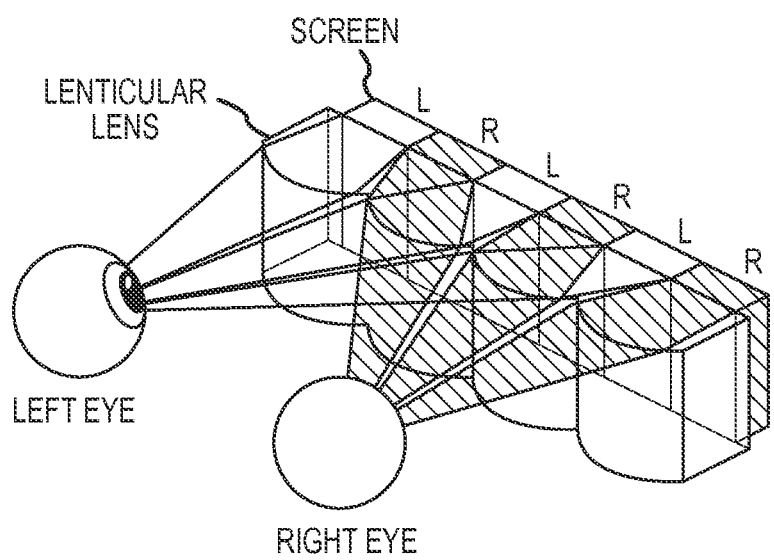

In one example, more pixels and/or sub-pixels) may be employed to achieve 3D autostereo and may be used with parallax barriers or lenticular lenses on top of a denser pixel grid. FIG. 11 is a schematic diagram illustrating embodiments of a parallax-barrier autostereoscopic display and lenticular autostereoscopic display. Both of these approaches may use the lenses or the barriers so that as the view angle changes the pixels that may be seen by the viewer also changes. This may allow the display to change the viewing image with a change in viewing angle. The parallax barrier and lenticular lens structures may be placed on top of the grid of phosphors, either under or on top of the protective layers so that different pixels may be addressed to show different images per viewing angle allowing for a 3D effect without wearing glasses. Generally, the appropriate number of views may be approximately 8-50 in the horizontal direction and approximately 2-5 in the vertical direction. Thus the number of extra sub-pixels may be similar to the total number of views for the same overall image resolution. Further, Parallax barriers and lenticular lens arrays may be demonstrated in the example of the right and left eyes viewing two different images due to the change in viewing angle between the eyes. By seeing two different images, a 3D viewing experience is enabled.

It should be noted that embodiments of the present disclosure may be used in a variety of optical systems and display systems. The embodiment may include or work with a variety of optical systems, optical components, computer systems, processors, entertainment systems, visual and/or audiovisual systems and electrical and/or optical devices. Aspects of the present disclosure may be used with practically any apparatus related to display, optical and electrical devices, optical systems, display systems, entertainment systems, presentation systems or any apparatus that may contain any type of optical system. Accordingly, embodiments of the present disclosure may be employed in optical systems, devices used in visual and/or optical presentations, visual peripherals and so on and in a number of computing environments including the Internet, intranets, local area networks, wide area networks and so on.

Before proceeding to the disclosed embodiments in detail, it should be understood that the embodiment is not limited in its application or creation to the details of the particular arrangements shown, because the embodiment is capable of other variations. Moreover, aspects of the embodiment may be set forth in different combinations and arrangements to define embodiments unique in their own right. Also, the terminology used herein is for the purpose of description and not of limitation.

As may be used herein, the terms "substantially" and "approximately" provide an industry-accepted tolerance for its corresponding term and/or relativity between items. Such an industry-accepted tolerance ranges from less than one percent to ten percent and corresponds to, but is not limited to, component values, angles, et cetera. Such relativity between items ranges between less than one percent to ten percent.

While various embodiments in accordance with the principles disclosed herein have been described above, it should be understood that they have been presented by way of example only, and not limitation. Thus, the breadth and scope of this disclosure should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 CFR 1.77 or otherwise to provide organizational cues. These headings shall not limit or characterize the embodiment(s) set out in any claims that may issue from this disclosure. Specifically and by way of example, although the headings refer to a "Technical Field," the claims should not be limited by the language chosen under this heading to describe the so-called field. Further, a description of a technology in the "Background" is not to be construed as an admission that certain technology is prior art to any embodiment(s) in this disclosure. Neither is the "Summary" to be considered as a characterization of the embodiment(s) set forth in issued claims. Furthermore, any reference in this disclosure to "invention" in the singular should not be used to argue that there is only a single point of novelty in this disclosure. Multiple embodiments may be set forth according to the limitations of the multiple claims issuing from this disclosure, and such claims accordingly define the embodiment(s), and their equivalents, that are protected thereby. In all instances, the scope of such claims shall be considered on their own merits in light of this disclosure, but should not be constrained by the headings set forth herein.

What is claimed is:

1. A display system, comprising:
    a light source operable to scan with a beam and further operable to produce light energy;
    at least a first substrate and a second substrate joined together to form the appearance of a seam and operable to receive light from the light source;
    a first phosphor layer proximate to the first substrate and a second phosphor layer proximate to the second substrate and operable to transmit light for images; and
    wherein the light source comprises an array of light engines, wherein the first substrate is substantially illuminated by at least an individual light engine of the array of light engines to generate a substantially seamless appearance.

2. The display system of claim 1, further comprising a wavelength selective mirror proximate to the first phosphor layer.

3. The display system of claim 1, further comprising:
    a polarizer layer operable to receive at least some light from the phosphor layer; and
    a film patterned retarder layer operable to receive at least some light from the polarizer layer.

4. The display system of claim 3, further comprising a diffuser layer operable to receive at least some light from the film patterned retarder layer.

5. The display system of claim 3, further comprising a wavelength selective mirror proximate to the first phosphor layer.

6. The display system of claim 5, wherein the wavelength selective mirror is operable to substantially reflect RGB light and to substantially transmit light at approximately 405 nanometers.

7. The display system of claim 2, wherein the wavelength selective mirror is operable to substantially reflect RGB light and to substantially transmit light at approximately 405 nanometers.

* * * * *